US012332964B1

(12) United States Patent
Sanders et al.

(10) Patent No.: US 12,332,964 B1
(45) Date of Patent: Jun. 17, 2025

(54) DIFFERENTIAL STATIC AND DYNAMIC CACHING ON AN EDGE COMPUTING SYSTEM

(71) Applicant: NOSTRA, INC., San Francisco, CA (US)

(72) Inventors: Scott Sanders, Layton, UT (US); Mario Tinoco, Davis, CA (US)

(73) Assignee: NOSTRA, INC.

( * ) Notice: Subject to any disclaimer, the term of this patent is extended or adjusted under 35 U.S.C. 154(b) by 58 days.

(21) Appl. No.: 18/536,205

(22) Filed: Dec. 11, 2023

(51) Int. Cl.
*G06F 16/957* (2019.01)
*G06F 12/0806* (2016.01)
*G06F 16/958* (2019.01)
*G06F 40/197* (2020.01)
*H04L 67/568* (2022.01)

(52) U.S. Cl.
CPC ...... *G06F 16/9574* (2019.01); *G06F 12/0806* (2013.01); *G06F 16/986* (2019.01); *H04L 67/568* (2022.05); *G06F 40/197* (2020.01)

(58) Field of Classification Search
CPC .............. G06F 16/9574; G06F 16/986; G06F 12/0806; H04L 67/568
See application file for complete search history.

(56) References Cited

U.S. PATENT DOCUMENTS

| | | | |
|---|---|---|---|
| 8,073,970 B2 | 12/2011 | Schwimer | |
| 8,171,161 B2 | 5/2012 | Schwimer | |
| 9,753,904 B2 | 9/2017 | Liu et al. | |
| 10,157,236 B2 | 12/2018 | Alstad | |
| 10,218,810 B2 | 2/2019 | Kuperman et al. | |
| 2014/0293875 A1* | 10/2014 | Ramakrishnan | H04L 67/568 |
| | | | 370/328 |
| 2016/0182672 A1* | 6/2016 | Kuperman | G06F 16/9574 |
| | | | 709/213 |

FOREIGN PATENT DOCUMENTS

| | | |
|---|---|---|
| CN | 113468456 A | 10/2021 |
| CN | 114466412 A | 5/2022 |

* cited by examiner

*Primary Examiner* — Clayton R Williams
(74) *Attorney, Agent, or Firm* — Daylight Law, P.C.

(57) ABSTRACT

Methods and systems which involve edge computing systems with improved edge performance are disclosed herein. A disclosed method includes transmitting first and second edge requests for a webpage, analyzing first and second responses to the first and second requests, and identifying a collection of dynamic content document objects on the webpage. The webpage comprises the collection of dynamic content document objects and a collection of static content document objects. The method further includes caching the collection of static content document objects and in response to receiving a client request for the webpage: transmitting the collection of static content document objects from the cache; and transmitting a third edge request for the collection of dynamic content document objects. The method further includes receiving the collection of dynamic content document objects and transmitting the collection of dynamic content document objects to the client device.

26 Claims, 6 Drawing Sheets

DIFFERENTIAL STATIC AND DYNAMIC CACHING ON AN EDGE COMPUTING SYSTEM

BACKGROUND

Edge computing systems and content delivery networks (CDNs) play pivotal roles in shaping the modern internet landscape. Edge computing brings computational resources closer to the end-users, reducing latency and enhancing the overall user experience. By distributing processing power and data storage across a network of edge devices, it allows for quicker response times and more efficient data processing, making it ideal for applications like internet of things (IoT), real-time analytics, and augmented reality. Meanwhile, CDNs act as a vital backbone of the internet, optimizing content delivery by storing copies of web content on servers located in strategic geographic locations. This results in faster loading times and less strain on origin servers, which is essential for the smooth functioning of websites, streaming services, and e-commerce platforms. Together, edge computing and CDNs provide the speed, reliability, and scalability required to meet the demands of today's data-intensive, globally connected digital world.

Caching information on edge computing systems is a strategic approach to enhance the performance of the modern internet. This process involves storing frequently accessed data and content on local servers at the network's edge, closer to end-users. When users request data, the system retrieves it from these nearby caches, instead of from origin servers, significantly reducing the round-trip time and latency. This localized approach not only speeds up content delivery but also alleviates the burden on central data centers, leading to more efficient network utilization and cost savings. As a result, the modern internet benefits from reduced data transfer times, lower bandwidth consumption, and improved reliability, ultimately providing users with a smoother and faster online experience. This approach is particularly valuable for bandwidth-hungry applications, such as video streaming and large file downloads, where latency can significantly impact user satisfaction. However, nearly all internet and networked communications can be improved using distributed localized caching including the delivery of websites for news, social media, e-commerce, and web accessible applications.

SUMMARY

Methods and systems which involve edge computing systems are disclosed herein. More specifically, methods and systems to improve the edge performance of edge computing systems using differential caching are disclosed herein. As used herein, the term "edge performance" refers to the speed at which content can be delivered from an edge computing system to a client device in response to a request for that content from the client device. The term is not exclusive to latency performance or bandwidth performance and includes the perceived speed of content delivery from the perspective of a user of a client device.

Specific embodiments of the invention disclosed herein utilize differential caching on an edge computing system, in which dynamic content is cached differently than static content, to improve the edge performance of the edge computing system. The static content is content which does not change on a given webpage in response to separate requests for the webpage, and the dynamic content is content that does change on a given webpage in response to separate requests for the webpage. The static and dynamic content can combine to form the entire webpage but can be cached using different procedures and then reconstituted into the webpage in response to a client device request for the webpage using various approaches disclosed herein. In specific embodiments, the static content can be cached locally and delivered in response to a request for the webpage while the dynamic content is not cached locally and is requested from an origin server in response to that same request.

In accordance with specific embodiments disclosed herein, the static and dynamic content of a webpage can be identified for differential caching using automated procedures such that manual tagging or labeling of the content of the webpage for purposes of differential caching is not required. As such, the webpage does not require any labels that identify objects in a document object model of the webpage as dynamic or static content document objects, but the edge computing system can still differentially cache the content of the webpage. Using some of the approaches disclosed herein, the dynamic content can be identified using a comparison of responses received from a server where the responses are provided in response to requests for the webpage. The requests can be identical requests sent at different times, or different requests that represent different interaction flows with the webpage or the website of which the webpage is a part. An automated comparison of the responses received in response to these requests can be used to identify dynamic content on the webpage.

In accordance with specific embodiments disclosed herein, the static content can be cached in such a way that it can be independently rendered on a client device without the dynamic content. For example, a webpage can be stored in a genericized format which includes the static content and genericized versions of the dynamic content. Using some of the approaches disclosed herein, the genericized format of the webpage can be delivered to a client device and rendered without the dynamic content such that the edge computing system can begin to service the client device and the client device can being to render the webpage for the user before the dynamic content is provided to the client device. In specific embodiments, the website can be delivered in the genericized format along with a script to instruct the client device on how to reconstitute the webpage as the dynamic content is subsequently received.

In accordance with specific embodiments disclosed herein, computer-implemented methods are provided. The computer-implemented methods can be achieved by specific means which are disclosed in the detailed description below. The computer-implemented methods can be implemented by an edge computing system. The edge computing system can implement the specific means which are disclosed in the detailed description below. One or more non-transitory computer-readable media can store instructions that cause an edge computing system to execute the computer-implemented methods.

In accordance with specific embodiments disclosed herein, a computer-implemented method, in which each step is conducted by an edge computing system is provided. The method comprises transmitting, by a node of the edge computing system, a first edge request for a webpage using a network and a second edge request for the webpage using the network. The method further comprises, receiving and analyzing, by the node of the edge computing system, a first response to the first edge request and a second response to the second edge request. The method further comprises identifying, based on the analysis, a collection of dynamic content document objects on the webpage. The webpage comprises the collection of dynamic content document objects and a collection of static content document objects. Further, the method comprises caching, using a cache, the collection of static content document objects, receiving, by the node of the edge computing system, a client request for the webpage and transmitting to the client device, in response to receiving the client request for the webpage, the collection of static content document objects from the cache using the network. Simultaneously, the method further comprises transmitting to an origin server, in response to receiving the client request for the webpage, a third edge request for the collection of dynamic content document objects using the network. The method also comprises receiving the collection of dynamic content document objects in response to the third edge request and transmitting, to the client device, the collection of dynamic content document objects as received in response to the third edge request using the network.

In specific embodiments, the method disclosed above can be performed when the first edge request and the second edge request are identical and when they are not identical. In the latter case, the method comprises storing a first interactivity flow and a second interactivity flow with the webpage, wherein the first edge request is part of the first interactivity flow and the second edge request is part of the second interactivity flow.

In specific embodiments, the method disclosed above can be performed such that the first edge request and the second edge request for the webpage are sent as part of a caching schedule while a node of the edge computing system is idle.

In specific embodiments, the method disclosed above can be performed such that the first response received by the node of the edge computing device comprises a first hypertext markup language encoding of the webpage with a first set of dynamic content for the collection of dynamic content document objects and the second response comprises a second hypertext markup language encoding of the webpage with a second set of dynamic content for the collection of dynamic content document objects.

In specific embodiments, the method disclosed above can be performed such that it further comprises analyzing the responses by text comparison of a first hypertext markup language encoding of the webpage and a second hypertext markup language encoding of the webpage. The method can perform identification of document object models of the webpage as dynamic or static content document objects without requiring any labeling of the document objects.

In specific embodiments, the method disclosed above can be performed such that identifying the collection of dynamic content document objects comprises generating a set of regular expressions with reference to a hypertext markup language encoding of the webpage.

In specific embodiments, the method disclosed above can be performed such that it further comprises generating a genericized static version of the webpage. The genericized static version of the webpage can include the collection of static content document objects and a set of genericized versions of the collection of dynamic content document objects. The method can also comprise caching the genericized static version of the webpage comprising the collection of static content document objects and transmitting, to a client device, the genericized static version of the webpage using the network. The genericized static version of the webpage, along with the set of regular expressions and the collection of dynamic content document objects, can contain sufficient information to reconstitute the webpage.

In specific embodiments, the method disclosed above can be performed such that it further comprises transmitting, using the network, a script to the client device to process the collection of dynamic content document objects. The script to process the collection of dynamic content document objects can comprise instructions on how to use the set of regular expressions to replace the set of genericized versions of the collection of dynamic content document objects with the collection of dynamic content document objects.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
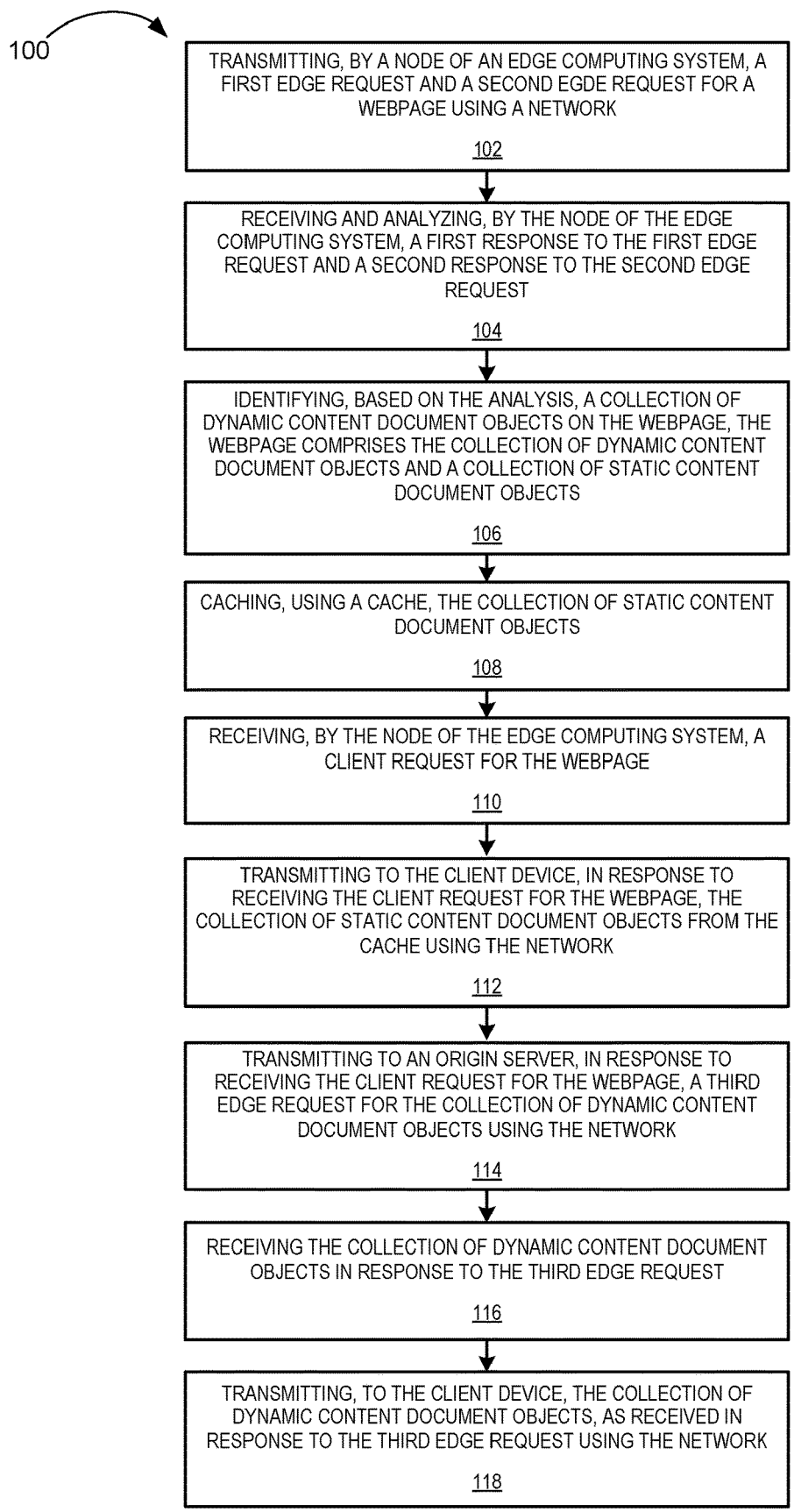
FIG. 1 illustrates a flow chart of a computer-implemented method in accordance with specific embodiments of the invention disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems which involve edge computing systems are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Throughout the present disclosure the term "edge request" refers to a request that is initiated by a node/computing device in an edge computing system. The edge request can comprise a reference to a webpage, resource, URL, etc., which is available at an origin server. Generally, the edge request is for resource types like HTML files, images, CSS stylesheets, JavaScript files, and other resources that make up a web page. The edge request also contains requests for content that is generated on-demand based on user input or other variables. This may include database queries, form submissions, or other interactions that require processing on the server side. Edge nodes may also communicate with each other for tasks like load balancing, data synchronization, or sharing processing tasks. Communication between edge nodes may also involve the synchronization or replication of data between different edge nodes to ensure consistency and redundancy. The types of requests in an edge computing environment can vary depending on the specific application and the architecture in use.

An edge computing node refers to a device or a server located at the edge of a network, closer to the data source or end-user devices than an origin server. These nodes can be responsible for processing, storing, and analyzing data locally, rather than sending it to a centralized cloud server for processing. An edge system refers to a centralized or distributed computing architecture that cooperates with one or more origin servers and extends computation and data storage closer to the sources of data generation, consumption, or processing. An edge network typically consists of a decentralized collection of computing resources distributed geographically.

A client device can be any device used to access content on a network. For example, the client device can be a smartphone or laptop computer being used to access content from the internet. User and client are used interchangeably in this entire description and refer to a user of a computing device that requires a resource administrated by an origin server (e.g., a client device).

An origin server is a key component in content delivery networks (CDNs) and edge computing architectures. As used in this disclosure, an origin server can refer to the original source of content or processing power for a website or application. The origin server can be where content is initially stored and maintained. The origin server can be in a centralized data center, often in a cloud environment or a dedicated server infrastructure. The origin server can be responsible for storing the master copies of web pages, images, videos, and other resources that make up a website or application and it is where updates and changes to the content are made.

FIG. 1 illustrates a flow chart 100 describing the steps implemented by an edge computing system in accordance with specific embodiments of the invention disclosed herein. Flow chart 100 comprises computer-implemented steps 102, 104, 106, 108, 110, 112, 114, 116 and 118. At step 102, a node of the edge computing system transmits a request for a webpage using a network. There can be multiple requests for resources by the edge node/server to the origin server. As illustrated, step 102 encompasses multiple such requests, even though only the first and second request are shown.

Each request from the edge node is reciprocated by a response containing the requested content from the origin server. Step 104 illustrates receiving the response to each such request and analyzing the responses. As shown, there is a first response to the first request and a second response to the second request.

In different embodiments of the invention, there can be different types of requests made, and the requests can be the same/identical or different/non-identical. When the requests are the same/identical, the origin server can respond with dynamic content differently in response to the same requests (e.g., advertising content, where the content request is for an advertisement, but the response can be for a first product in the first request response and for a different product in the response to the second request). When the requests are different/non-identical, the origin server can respond with dynamic content for the same webpage that is different based on the difference in the request (e.g., for a login by a first user as opposed to a login by a second user with different credentials). The origin server can respond with dynamic content containing different contents (e.g., an addition of an item to a cart with 2 items in the case of user 1 as opposed to an addition of an item to a cart with 3 items in the case of user 2).

In specific embodiments of the invention, the origin server can also respond with dynamic content containing different content based on different user interactions with the web page. The different user interactions can be defined by different interactivity flows in the form of series of encoded definitions. These different requests are responsible for the origin server providing different dynamic content based on the requests. The different interactivity flows can be manually defined by engineers that are characterizing the interactivity of the webpage. These different interactivity flows can then be applied to the webpages to scan for dynamic content in an automated fashion. The different interactivity flows (e.g., series of encoded definitions) can be stored in association with the respective request (e.g., the first interactivity flow can be stored in association with a first request and the second interactivity flow can be stored in association with the second request). Running the interactivity flows in an automated fashion can thereby include sending the associated requests to an origin server to attempt to identify dynamic content on a webpage managed by the origin server.

Flow chart 100 includes step 104 of analyzing responses. The step can comprise a text comparison of different encodings to identify different sets of dynamic content. For example, a first hypertext markup language encoding of the webpage with a first set of dynamic content containing a collection of dynamic content document objects can be compared with a second hypertext markup language encoding of the webpage with a second set of dynamic content. The first and second hypertext markup language encodings of the webpage can then be analyzed (e.g., via a text comparison) to identify dynamic content. The text comparison can comprise identifying a collection of differing text strings in the first and second markup language encodings of the webpage. In specific embodiments, described below in which a genericized version of the webpage is generated, the different text strings can be replaced with spaces such that responses with different dynamic content are reduced to the same generic response. As used herein, the term hypertext markup language encoding can also include other languages such as JavaScript and the resources referenced by the encoding as well as other resources such as image files.

At step 106, based on the analysis, a collection of dynamic content document objects of the webpage and a collection of static content document objects are identified. The static and dynamic content document object types have been described above. The identification of dynamic content can comprise generating a set of regular expressions with reference to a hypertext markup language encoding of the webpage. Regular expressions can be used for pattern matching and manipulation of text. The regular expressions can be a sequence of characters that define a search pattern. Regular expressions can be used in various text manipulation tasks such as search and replace, data validation, and text processing. The expressions can be versatile and can be used for tasks ranging from simple text search to complex text processing operations. Each character in a regular expression (i.e., each character in the string describing its pattern) can be either a metacharacter, having a special meaning, or a regular character that has a literal meaning. In alternative embodiments, the identification of dynamic content can comprise generating a set of code section or object identifiers using JavaScript, C, C++, Rust or any other alternative computing language that allows for the definition of code sections or object identifiers.

In specific embodiments of the invention, static and dynamic content objects of a webpage need not be labelled/tagged manually by an owner of the website for caching purposes. In specific embodiments of the invention, the identification of static and/or dynamic content is done automatically, which provides a significant advantage over the prior art. The storage and comparison of different interactivity flows in association with the different requests plays a role in automating the caching process for static content only and thus not requiring separate labelling of static and dynamic content.

At step 108, once the static and dynamic content document objects have been identified, the collection of static content document objects are stored in a cache. In this step, a genericized static version of the webpage can be generated comprising the collection of static content document objects and a set of genericized versions of the collection of dynamic content document objects. The genericized static version can be independently rendered by a browser. By sending the genericized version to the client device from the cache, the client device can begin rendering the webpage right away before the dynamic content is received by the client device. The static content document objects can be cached as independent elements or as elements in a genericized static version of the webpage. Although various types of cache storages like CPU caches, web caches, database caches, and content delivery network (CDN) caches can be used, it is preferable to use web caches for the current application scenario, as web caches are generally used to store web page content (HTML, images, scripts) on a local server to reduce the load on the origin server and improve webpage load times for users.

In specific embodiments, the above steps (steps 102 to 108) can be executed by an edge computing node/server, when there is not a substantial computing load on the node/server, (e.g., when the computing node/server is otherwise idle such as at specific times during the day or in response to an actual real time monitoring of the resource consumption on the computing device). For example, a specific node or server of the edge computing system that is not currently processing a high volume of requests can conduct steps 102 to 108 on webpages that have been flagged or scheduled for caching on that node or server. Further, these steps can be executed as part of a caching schedule or when a website is onboarded or introduced newly to the edge computing device as part of a crawling process or a schedule to search for updates to the website. These schedules can be initiated/pre-programmed by the owner of the website to update the cache with the latest content.

At step 110, a client using a client device sends a request for accessing a webpage on an origin server and the same is received by the edge node. The webpage can be generally referenced using a Uniform Resource Locator (URL) and can contain headers. At step 112, the edge node can, after receiving the request from the client, check its local cache for any static content associated with the requested web page. If the static content is available, the edge node can transmit the static content to the client device to be rendered on the browser of the client device. If the static content is not available in the cache of the edge node (e.g., when a new webpage is requested or when a webpage was not previously crawled or analyzed as part of a caching schedule), then the edge node can service the request in combination with an origin server and initiate the capture process, as will be described in conjunction with FIG. 3 below.

At step 114, the edge node sends a third edge request to the origin server, requesting the collection of dynamic content document objects associated with the webpage. At step 116, the edge node receives the dynamic content from the origin server, comprising the dynamic content associated with the requested webpage. At step 118, the dynamic content received from the origin server is sent to the client device to be rendered along with the static content on the display of the client device. In specific embodiments, the step of rendering the requested resource on the client device can be conducted using a genericized static version of the webpage, a set of regular expressions, and the collection of dynamic content based on the response to the third edge request. In specific embodiments, upon receiving the genericized static version of the webpage, the set of regular expressions, and the collection of dynamic content, the client device is in possession of sufficient information to reconstitute the entire webpage and display the webpage on the client device.

In specific embodiments, the collection of dynamic content document objects provided in response to the edge request can be provided along with the transmitting of one or more scripts to the client device to process the collection of dynamic content document objects. The scripts transmitted to the client device can reference the dynamic content associated with the request. The scripts to process the collection of dynamic content document objects can also be provided to the client device with a set of regular expressions and comprise instructions on how to use the set of regular expressions to replace a set of genericized versions of the collection of dynamic content document objects with the collection of dynamic content document objects specific to the current request.

Figure 2:
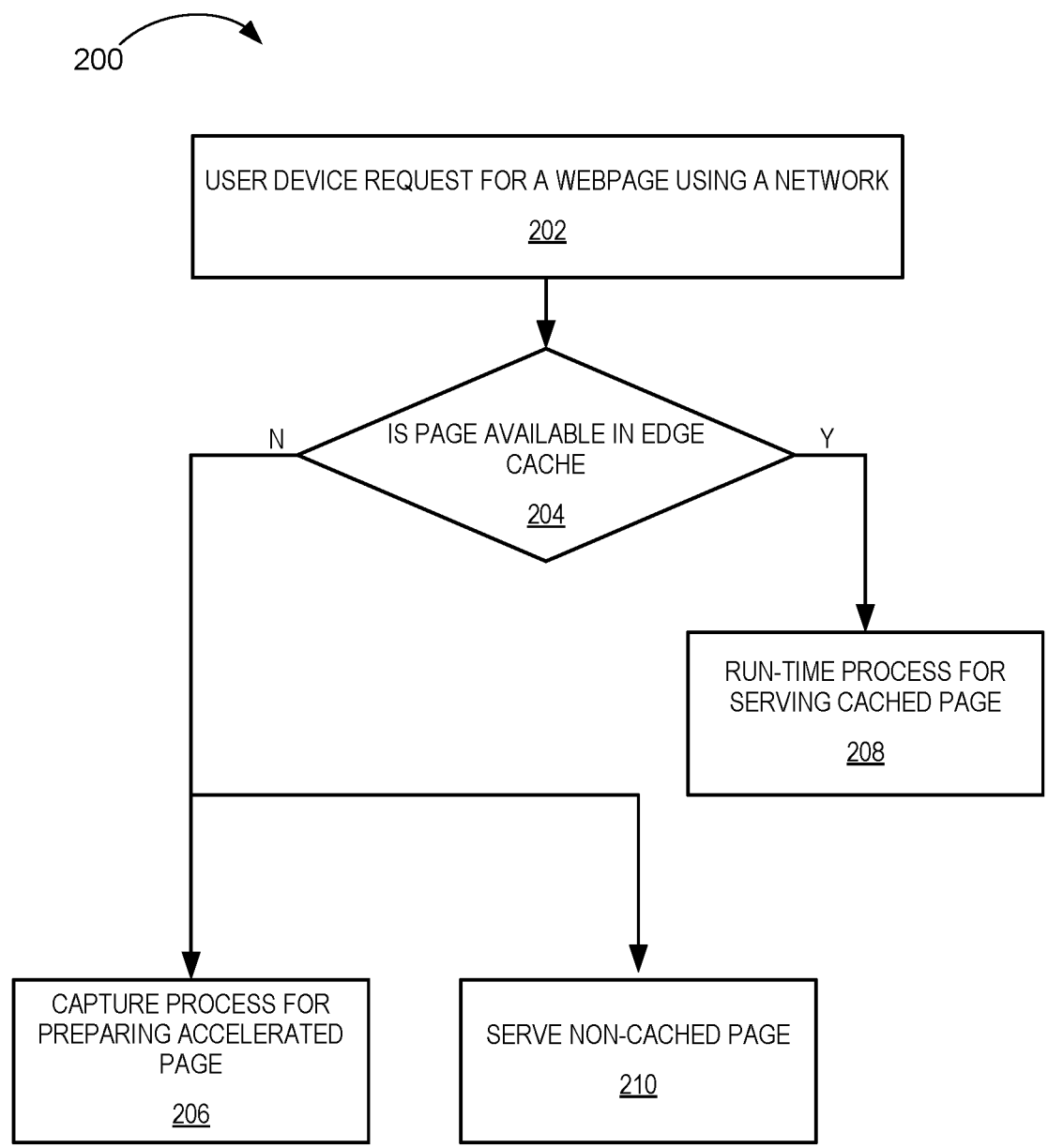
FIG. 2 illustrates a flow chart of an edge flow process in accordance with specific embodiments of the invention disclosed herein.

FIG. 2 illustrates a flow chart 200 describing a process implemented by the computer implemented method of the edge computing system in accordance with specific embodiments of the invention disclosed herein. At step 202, a user requests a webpage from a node of the edge computing system using a network. At step 204, the edge computing node determines if the requested page is available in the local cache storage. Based on the determination in step 204, if the edge computing system does have the webpage in the cache, the system can execute the steps of runtime process 400 described with reference to FIG. 4. If, based on the determination, the edge computing node does not have the webpage in the cache, the capture process for the webpage can be executed at step 206. The capture process comprises multiple steps including the steps of preparing the webpage for storing the content in a cache. The step can be conducted in accordance with the steps of capture process 300 described with reference to FIG. 3. Asynchronously, step 210 of transmitting a non-cached page from the edge node to the client device can be executed. This process can be conducted using the standard process for delivering webpages by an edge node from an origin server. If it is determined that the webpage is already available in the cache of the edge computing node, then the run-time process is executed for transmitting the cached webpage to the client device to be rendered on the browser. Detailed execution steps of the capture process and the run-time process will be explained in further detail with reference to FIG. 3 and FIG. 4 respectively.

Figure 3:
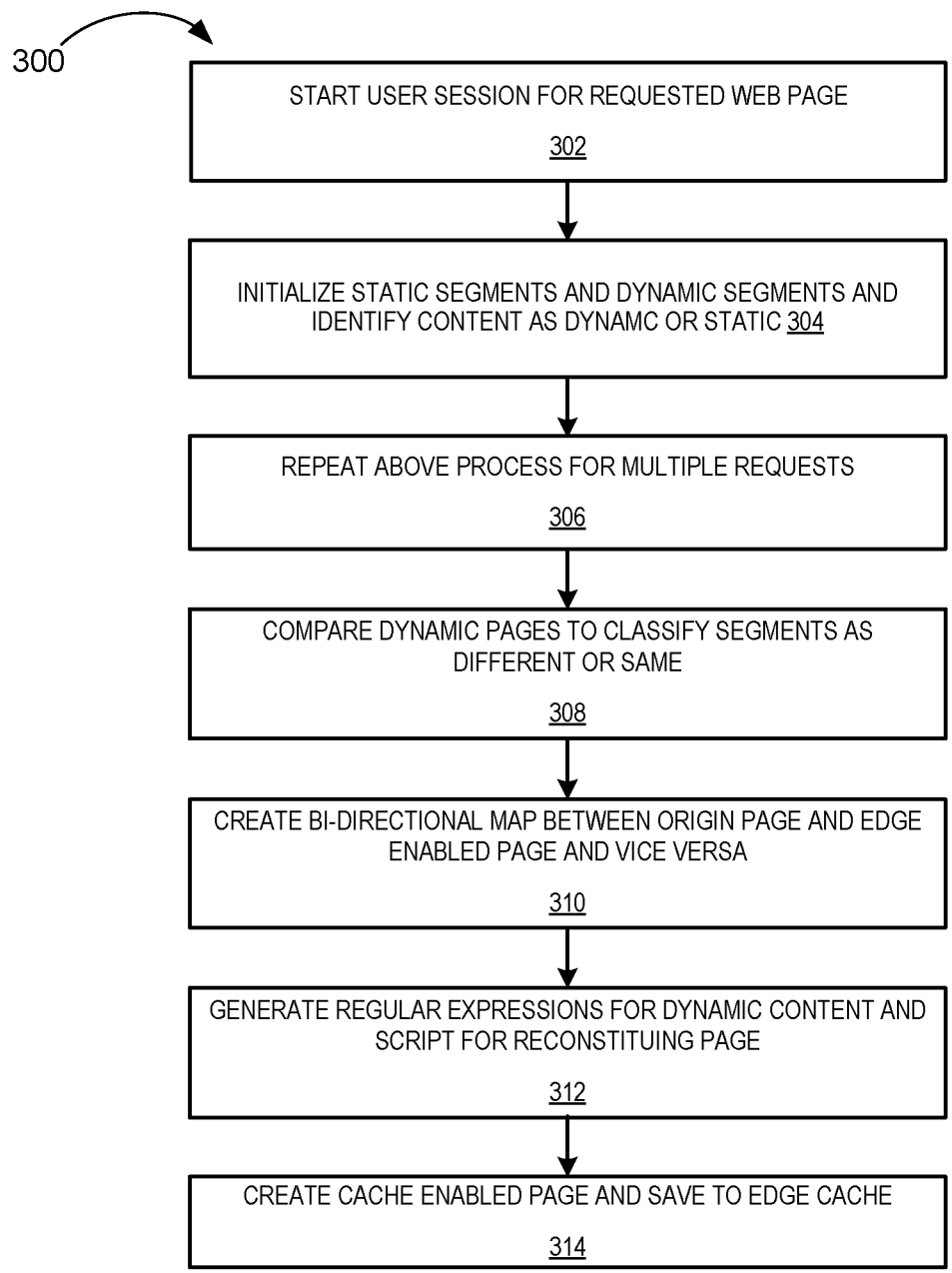
FIG. 3 illustrates a flow chart of a capture process in accordance with specific embodiments of the invention disclosed herein.

FIG. 3 illustrates a flow chart describing the capture process 300 implemented by the computer implemented method of the edge computing system in accordance with specific embodiments of the invention disclosed herein. The capture process can be executed by a node of the edge computing system. The process can include creating a cache enabled version of the webpage. The cache enabled version can be a genericized version of a webpage and can include static content and genericized versions of the dynamic content of the webpage. The process can include storing the cache enabled version of the webpage in the cache of the edge computing node. The process can include storing the genericized version of the webpage in the cache of the edge computing node.

In step 302, a user session is started for a requested webpage that will be the subject of the capture process. The page can be requested as part of an interactivity flow that has been stored for the webpage or a website of which the webpage is a part. At step 304, static segments and dynamic segments are initialized and identified as being static or dynamic as described with respect to FIG. 1. An example pseudocode utilized to initialize the static and dynamic segments and the resulting dynamic page in the form of HTML is provided below. The pseudocode can be part of an interactivity flow for the webpage.

```
start session (user-1)
  then navigate to product-1 page
  then add 'qty 3' of 'product-1 to cart
  capture HTML as dynamic-page-1'
  Example dynamic-page-1
  <html>
    <p>static segment 1</p>
    <p>product 1, count 3</p>
    <p>static segment 2</p>
  </html>
```

At step 306, the above process is repeated for multiple user requests (e.g., different user sessions, requests from multiple users, or identical requests used to scan for dynamic content that is not request or user dependent). The multiple user requests can all be part of different interactivity flows with the webpage, or they can be identical requests.

At step 308, the captured HTML pages are compared to classify the segments in the HTML code as the same or different. If the segments are different, then a set of dynamic segments has been identified and if the segments are the same, then a set of static segments has been identified. An example pseudocode utilized to initialize the static and dynamic segments in response to different requests and the resulting dynamic page in the form of HTML is provided below. The pseudocode can be part of an interactivity flow for the webpage.

```
start session (user-2)
  then navigate to product-2 page
  then add 'qty 4' of 'product-2 to cart
  capture HTML as dynamic-page-2'
  Example dynamic-page-2
  <html>
    <p>static segment 1</p>
    <p>product 2, count 4</p>
    <p>static segment 2</p>
  </html>
```

Dynamic content can be identified through a textual analysis of the HTML of the dynamic pages generated in response to the two requests in the above example. A genericized version of the webpage can then be generated by replacing any text strings that are different between the two encodings with spaces or some other character that is used as a placeholder. Such a page can be delivered to a browser to be rendered with generic dynamic content along with a script that uses regular expressions to indicate where the dynamic content can later be injected into the webpage. The script can replace the spaces with code representing the dynamic content at a later time in order for the browser to render the complete web page. Alternatively, the script can be integrated into the genericized version of the webpage as illustrated below where the script is designed to determine if dynamic content with a regular expression matching that of the location in which the script is embedded is available and injecting that dynamic content when it becomes available. A resulting cache enabled page with genericized dynamic content objects is provided below.

```
Example edge-enabled-page
<html>
<p>static segment 1</p>
<p><script>
// retrieve dynamic-segment-1 from origin bypassing
   proxy
</script></p>
<p>static segment 2</p>
</html>
```

At step 310, a bi-directional map can be created. The bi-directional map can link an origin server page to a cache enabled page and vice versa. Subsequently, when a request is received for an origin server page, the bi-directional map can be used to find the cache enabled page in the cache.

At step 312, a set of regular expressions can be generated which identify the dynamic content on the page and a client-side script can be generated, using those regular expressions, which can enable a client device to reconstitute the original webpage by substituting dynamic content in at the places identified by the regular expressions. The client-side script can comprise instructions on how to reconstitute the webpage as described above. At step 314, the cache enabled page is created and saved to an edge cache. As described above, the cache enabled page comprises a genericized version of the webpage.

Figure 4:
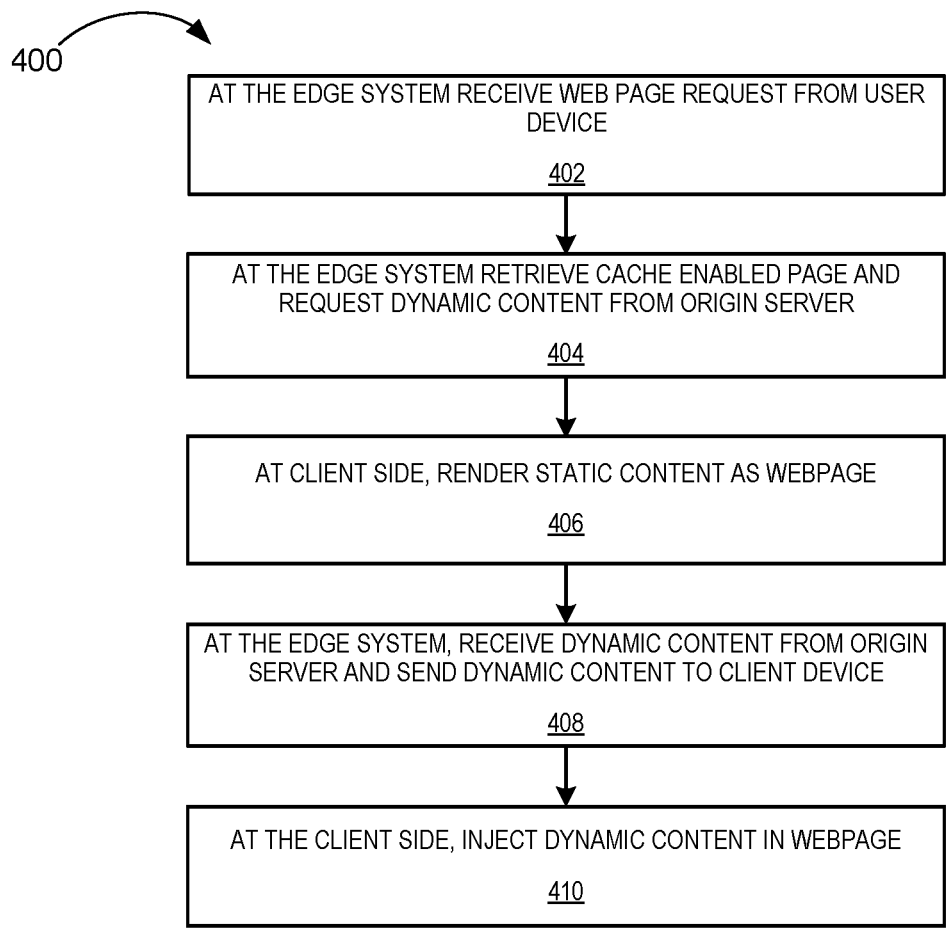
FIG. 4 illustrates a flow chart of a runtime process in accordance with specific embodiments of the invention disclosed herein.

FIG. 4 illustrates a flow chart describing the runtime process 400 implemented by an edge computing system in accordance with specific embodiments of the invention disclosed herein. The runtime process is executed by a node of the edge computing system for rendering the client requested webpage on the display of the client device. At step 402, a request from the client device is received by the node of the edge computing system. At step 404, since it is already determined that the cache enabled page is available in the cache, it is retrieved from the edge cache by the edge node/server and transmitted to the client device. At the same time, the edge node/server transmits a request to the origin server for the dynamic content. The request can be generated using the same request that is received from the client device in order to retrieve the dynamic content that would otherwise have been provided if the client request had been directly received by the origin server from the client device. In specific embodiments, the cache enabled page comprises a genericized version of the webpage and a client-side script for injecting dynamic content into the genericized version of the webpage. At step 406, at the client-side, using the cache enabled page, the static content of the page is rendered as a webpage. At step 408, at the edge node, the dynamic content has been received from the server and is sent to the client device. At step 410, at the client device, the dynamic content that has been received from the edge node is injected into the webpage such that the full web page is rendered at the client device. This step can be conducted by injecting new dynamic content, retrieved from the origin server, into the document object model (DOM) objects of the browser of the client device.

Figure 5:
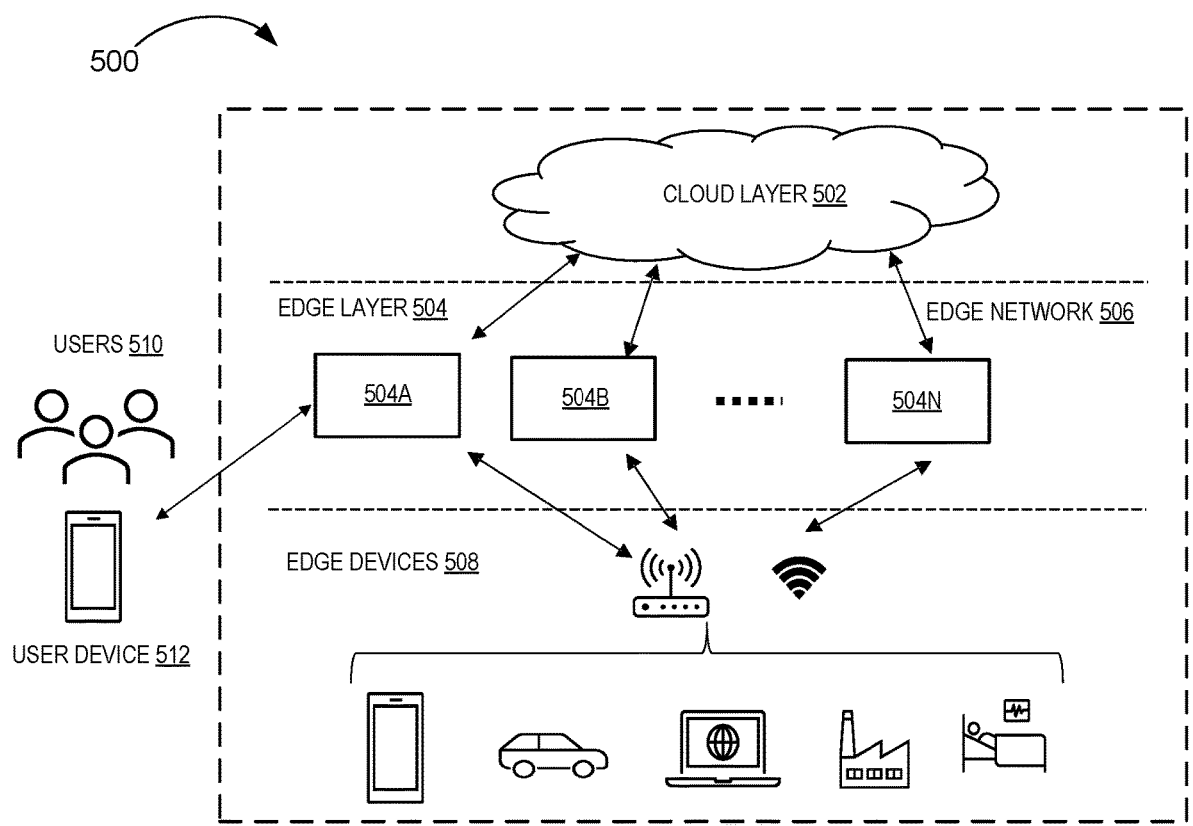
FIG. 5 illustrates a system architecture of an edge computing system in accordance with specific embodiments of the invention disclosed herein.

FIG. 5 illustrates the overall system architecture of the edge computing system 500 in accordance with specific embodiments of the invention disclosed herein. The first layer 502 comprises one or more origin servers in a cloud-based network. The cloud layer is connected to edge layer 504 via edge network 506. One or more edge nodes/computing devices 504A, 504B, . . . , 504N are connected to the edge network and comprise resources (hardware/software) to process the requests made by users 510 on client devices 512 and edge devices 508 using the edge network. The edge nodes/computing devices comprise edge caches (not shown here) that are configured to store the static content and genericized version of webpages for faster delivery to client devices, based on requests from specific users of the client device.

Figure 6:
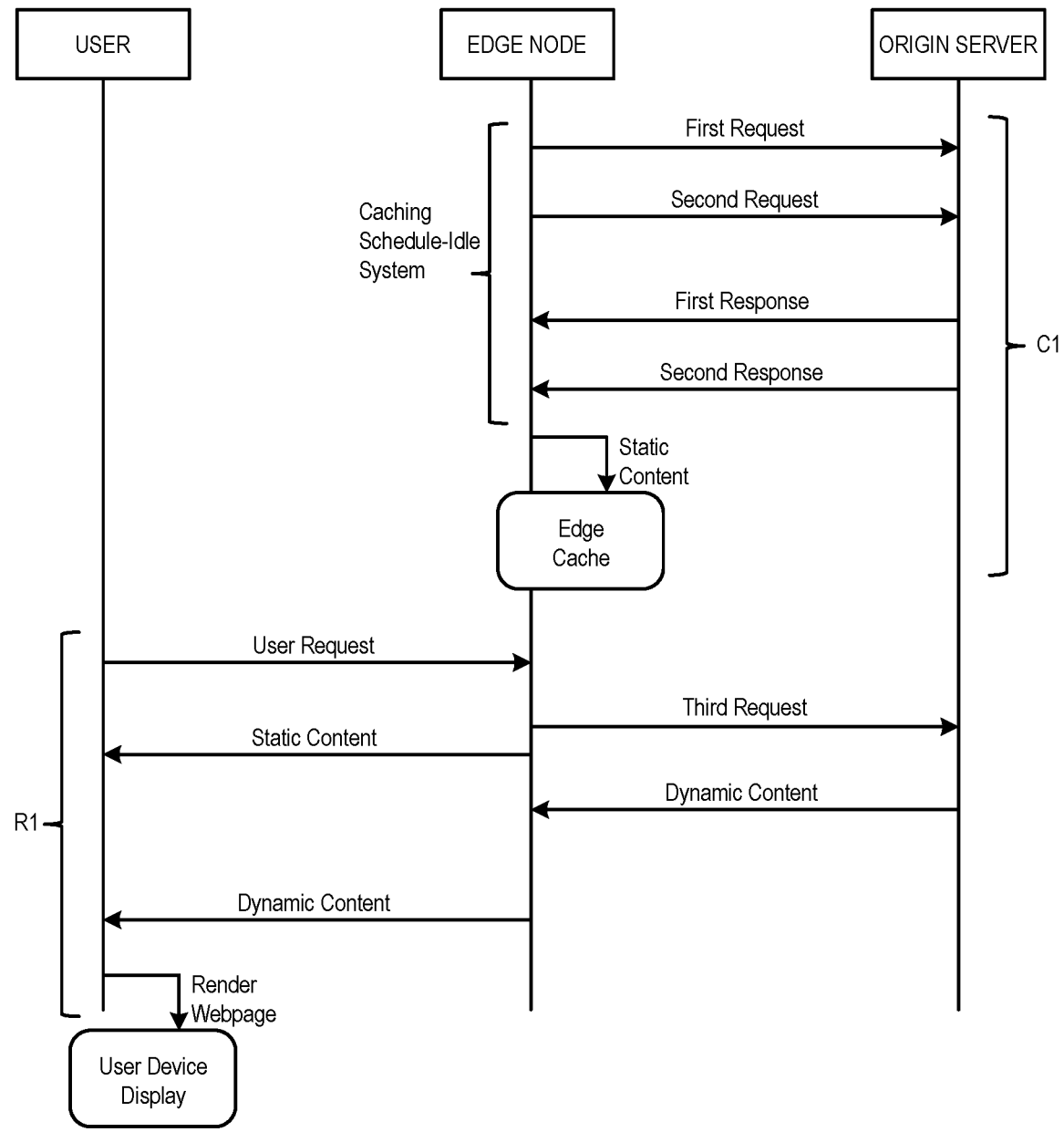
FIG. 6 illustrates a ladder diagram of a client device, an edge node, and an origin server conducting methods that are in accordance with specific embodiments of the invention disclosed herein.

FIG. 6 illustrates a ladder diagram of a client device, an edge node, and an origin server conducting methods that are in accordance with specific embodiments of the invention disclosed herein. The ladder diagram illustrates how an edge node can service a user request for a webpage in accordance with specific embodiments of the invention disclosed herein. The sequence of events comprises the caching steps C1 and rendering steps R1 as illustrated.

The caching steps can include one or more edge requests sent from the edge node to the origin server. The response from the origin server can be analyzed and static and dynamic content can be identified. The analysis can include a textual analysis of an encoding of the webpages that are provided in the responses. The process can include identifying dynamic content in the page. The identifying can be conducted by generating a set of regular expressions to identify the dynamic content. The dynamic content can be a set of dynamic content objects. The static content can then be cached in an edge cache. The static content can be cached in the form of a genericized version of the webpage. The genericized version can include the static content of the webpage, such as a set of static document objects, and genericized versions of a set of dynamic document objects. The set of dynamic document objects can be the dynamic content of the webpage. The collection of dynamic content document objects can comprise a set of tags and a set of text strings. For example, they can comprise the tags of an HTML encoding such as list or paragraph tags and text strings that are placed within those tags to define the parameters of a document object. The set of genericized versions of the collection of dynamic content document objects can comprise the set of tags and a set of spaces in place of the set of text strings. For example, the text strings can be a set of text strings that were different between the two encodings of the webpage and the text strings can be replaced with spaces so that the differences are genericized to a space value.

Subsequently, when a user requests a web page, the static content of the web page can be delivered to the user. The static content can be delivered in the form of a genericized version of the web page and a client-side script with instructions for injecting dynamic content into the web page. At the same time as the static content is delivered from the edge node, the edge node can request the dynamic content implicated by the request from the origin server. The received dynamic content from the origin server can then be transmitted to the client device. The client device can then combine the dynamic content and static content to render the complete webpage. The client-side script can include the regular expressions which identified the dynamic content and can use those regular expressions to guide the injection of the dynamic content. The client-side script can be executed by the browser of the client device and the received dynamic content can be rendered on the client device, thereby reconstituting the page with the latest dynamic content.

In specific embodiments of the invention, the systems and methods disclosed herein can include monitoring to verify the validity of the dynamic content identification over time. For example, the caching steps marked C1 in FIG. 6 can be repeated on a periodic, event-triggered, or random basis to assure that the identification of dynamic content on a page remains accurate and the page has been cached correctly. The repetition of the caching steps can be referred to as a process involving verifying steps. The process can be conducted in identical fashion using the same caching steps. In alternative embodiments, the verifying steps can be conducted slightly differently because the first or second response can be used to compare against a subsequent request (i.e., the system already has information regarding what the page would appear to be like if all the content was static). As such, any changes in response to a subsequent request could be determined to be dynamic content. The verification steps can be conducted when the edge computing device is otherwise idle or at least experiencing a low volume of edge requests to service. The verification steps can be conducted periodically every hour, every day, or according to a fixed period or schedule set by an owner of the pages that are being cached by the edge computing system.

The means for executing the method steps in the computer-implemented methods disclosed above can include an edge computing system. The edge computing system can be a distributed edge computing system. A distributed edge computing system can include multiple networked computing devices that operate together as part of a content delivery network to provide content from customers of the content delivery network to client devices. The customers of the content delivery network can use the edge computing systems to deliver content in the form of webpages and other content that can be distributed over a network to clients that request the webpages and other content.

An edge computing system in accordance with this disclosure can include a combination of specific hardware and software to ensure efficient and responsive performance. On the hardware side, the edge computing system can include processors, sufficient memory (e.g., RAM), and storage capabilities to handle data processing and caching. The edge computing system can also include specialized network interfaces, such as Ethernet or wireless connectivity, for communication with the broader network, origin servers, and client devices. The edge computing system may also incorporate security features like hardware-based encryption and secure boot mechanisms to protect sensitive data. Furthermore, an edge computing system can include accelerators like GPUs or FPGAs to handle computationally intensive tasks and facilitate real-time processing.

An edge computing system in accordance with this disclosure can also include software for the operation of edge computing systems. The edge computing system can include an optimized operating system, designed for low-latency and high-throughput tasks. The edge computing system can also include software platforms and frameworks, such as Docker or Kubernetes, used for containerization and orchestration, enabling efficient application deployment and scaling. The edge computing system can also include content delivery and caching software, like Nginx or Varnish, to store and serve web content quickly. The edge computing system can also include monitoring and management tools to ensure the health and performance of the system, with solutions like Prometheus and Grafana aiding in real-time data analysis and system maintenance. The edge computing system can include security software, including firewalls, intrusion detection systems, and encryption protocols, to safeguard both the device and the data it handles.

The edge computing systems disclosed herein can include a means for transmitting a first edge request for a webpage using a network and a means for transmitting a second edge request for the webpage using the network. The edge computing system can be programmed to send requests that will enable an analysis of the differences between the responses to the requests. The edge computing system can be programmed to design the requests so that they are identical requests for a webpage or such that they represent responses from two different interactivity flows with the webpage. The interactivity flows can be defined in a database or interactions that define the flows. The interactions can include regular expression definitions of which aspects of the webpage to interact with or modify. The interactions can be stored as prerecorded specific requests that can simply be accessed from the database in order to have the requests ready for sending. These requests can include the uniform resource locator (URL) of the webpage and may also include additional information, such as user-specific data or cookies, if applicable. In specific approaches, all the content of the request can be identical. In other approaches, the URL can be identical with different user-specific data or cookies. The origin server can then process the request, retrieve the necessary data, and send it back to the edge device.

The edge computing systems disclosed herein can include a means for analyzing, using an analysis, a first response to the first edge request and a second response to the second edge request. The edge computing system can be programmed to receive the responses, store them in memory, and run a text comparison on the source code of the two responses. The source code can include HTML and JavaScript. The edge computing system may be programmed to employ algorithms like the Longest Common Subsequence (LCS) to pinpoint differences between the two responses. A file containing a description of the differences can then be stored in memory.

The edge computing systems disclosed herein can include a means for identifying, via the analysis described above, a collection of dynamic content document objects on the webpage. The edge computing system can screen through a file containing a description of the differences between the two responses and save information regarding the dynamic content document objects such as the location of their starting and opening tags, an identifier of the objects in the source code, or other information necessary to identify a particular document object in a document. The edge computing system can be programmed to generate a regular expression definition of the dynamic content document objects using the file containing a description of the differences and one of the responses. The regular expression definition can define each of the dynamic content document objects in the collection of dynamic content document objects uniquely to the other objects in the webpage.

The edge computing systems disclosed herein can include a means for caching the collection of static content document objects, wherein the means for caching includes a cache. The means for caching can include control and administration circuits and memory to assure that the appropriate data is stored in the cache and is labeled or otherwise addressable so that it can be retrieved at a later time. The cache can be implemented using flash or RAM memory. The RAM memory can be double data rate RAM memory. The flash memory can be NAND or NOR flash. The memory can be phase change memory. The cache can store the data so that it can be rapidly accessed in response to a request for the data at a later time.

The edge computing systems disclosed herein can include a means for receiving a client request for the webpage. The edge computing system can be programmed to conduct a series of processes to receive the request. First, the client request, typically in the form of an HTTP request, is received over the internet or a local network. The edge computing system can listen for incoming requests on a designated port and IP address. Upon receiving the request, the edge computing system's web server software, like Apache or Nginx, interprets the request and identifies the specific webpage or resource being sought based on the requested URL. It then processes the request, possibly querying a cache, and retrieves the necessary data.

The edge computing systems disclosed herein can include a means for: (i) transmitting the collection of static content document objects from the cache using the network in response to receiving the client request for the webpage; and (ii) transmitting a third edge request for the collection of dynamic content document objects using the network in response to receiving the client request for the webpage. The edge computing device can be programmed to access the cache to find data associated with the client request and pull the static content document objects from the cache in response to this search. The static content document objects can be retrieved from the cache as a genericized version of the webpage which includes the static content document objects. The edge computing device can compile the requested webpage or resource and packages it in an HTTP response, which includes the status code, the headers, and the content itself. This response can then be sent back to the client through the same network connection as the request, enabling the client's browser to render and display the requested webpage. The edge computing system can be further programmed to transmit the third edge request up to the origin server in the same manner as provided above with respect to the first and second edge requests. However, the transmission of the third edge request can alternatively be designed to only request the dynamic content as opposed to the entire webpage. In specific embodiments, the entire webpage is requested, and the edge computing system can scrape the dynamic content from the entire webpage for delivery to the client device. In alternative embodiments, only the dynamic content is requested, and the edge computing system does not need to separate out the dynamic content from the webpage. An edge computing system can request just a portion of a webpage from an origin server using "partial content retrieval" or "byte serving." Instead of requesting the entire webpage, the edge computing system can send a request specifying the specific range of bytes or content it needs. This request can utilize regular expressions which were used to identify the dynamic content in an earlier step. Partial content retrieval can be accomplished by including HTTP headers such as "Range" in the request, indicating the desired byte range within the webpage's source file. The origin server can be designed to support this feature and can then process the request and retrieve and send only the requested portion.

The edge computing systems disclosed herein can include a means for receiving the collection of dynamic content document objects in response to the third edge request. In embodiments in which the collection of dynamic content document objects is delivered in the form of the entire webpage from the origin server, the means for receiving the collection of dynamic content document objects can include the same means used to retrieve the first and second responses disclosed above. In embodiments in which the collection of dynamic content document objects is delivered as part of a partial content retrieval, the means can include scripts that are designed to determine what content has been retrieved by analyzing the packets headers of the partial content retrieval and forwarding the content on to the client device that requires the content. Stream processing can be facilitated on the edge computing device to process a collection of dynamic content document objects that are received in sequence as they are received.

The edge computing systems disclosed herein can include a means for transmitting the collection of dynamic content document objects, as received in response to the third edge request, using the network. The edge computing system can be designed to forward packets received in response to the third edge request in the same manner as is used in modern edge computing devices when they provide origin server data, that is not available in the local cache of the edge computing device, to a client device. The edge computing system can be designed to modify the headers of the packets to reference a specific webpage if a partial content retrieval, or other process, does not include a webpage identifier on the packets. The edge computing system can also be designed to forward the content along with instructions on how to reassemble the web page using the collection of dynamic content document objects and the static content document objects. The instructions can inform the client device how to substitute out genericized dynamic content document objects with the subsequently delivered dynamic content document objects. The dynamic content document objects can be delivered to the webpage such that they are sent as updates to specific portions of the page to be rendered in place of the old version as they are received.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to the caching of webpages, the same approaches could be utilized to any network accessible content or resource which includes both static and dynamic content. Although examples in the disclosure were generally directed to edge computing systems, the same approaches could be utilized by any network node that services requests for content from a content requesting node on the network by accessing or caching content from a content provisioning node on the network. These and other modifications and variations to the present invention may be practiced by those skilled in the art, without departing from the scope of the present invention, which is more particularly set forth in the appended claims.

What is claimed is:

1. A computer-implemented method executed by an edge computing system, the computer-implemented method comprising:
    transmitting a first edge request for a webpage using a network;
    transmitting a second edge request for the webpage using the network;
    analyzing, using an analysis, a first response to the first edge request and a second response to the second edge request;
    identifying, based on the analysis, a collection of dynamic content document objects on the webpage, wherein the webpage comprises the collection of dynamic content document objects and a collection of static content document objects;
    generating a genericized static version of the webpage, wherein the genericized static version of the webpage includes the collection of static content document objects and a set of genericized versions of the collection of dynamic content document objects;
    caching, using a cache, the collection of static content document objects;
    receiving, a client request for the webpage;
    transmitting in response to receiving the client request for the webpage: (i) the collection of static content document objects from the cache using the network; and (ii) a third edge request for the collection of dynamic content document objects using the network;
    receiving the collection of dynamic content document objects in response to the third edge request; and
    transmitting the collection of dynamic content document objects, as received in response to the third edge request using the network.

2. The computer-implemented method of claim 1, wherein the first edge request and the second edge request are identical.

3. The computer-implemented method of claim 1, further comprising storing a first interactivity flow and a second interactivity flow with the webpage, wherein the first edge request is part of the first interactivity flow and the second edge request is part of the second interactivity flow.

4. The computer-implemented method of claim 1, wherein the first edge request and the second edge request are sent as part of a caching schedule for the webpage and while a node of the edge computing system is idle.

5. The computer-implemented method of claim 1, wherein:
    the first response comprises a first hypertext markup language encoding of the webpage with a first set of dynamic content for the collection of dynamic content document objects;

the second response comprises a second hypertext markup language encoding of the webpage with a second set of dynamic content for the collection of dynamic content document objects; and the analysis includes a text comparison of the first hypertext markup language encoding of the webpage and the second hypertext markup language encoding of the webpage.

6. The computer-implemented method of claim 1, wherein the computer-implemented method does not require any labels that identify objects in a document object model of the webpage as dynamic or static content document objects.

7. The computer-implemented method of claim 1, wherein the edge computing system is a distributed edge computing system.

8. The computer-implemented method of claim 1, wherein identifying the collection of dynamic content document objects comprises generating a set of regular expressions with reference to a hypertext markup language encoding of the webpage.

9. The computer-implemented method of claim 1, wherein:

caching the collection of static content document objects comprises caching the genericized static version of the webpage; and transmitting the collection of static content document objects from the cache using the network comprises transmitting the genericized static version of the webpage using the network.

10. The computer-implemented method of claim 1, wherein:

identifying the collection of dynamic content document objects comprises generating a set of regular expressions with reference to a hypertext markup language encoding of the webpage; and the genericized static version of the webpage, the set of regular expressions, and the collection of dynamic content document objects contain, in combination, sufficient information to reconstitute the webpage.

11. The computer-implemented method of claim 1, wherein:

the collection of dynamic content document objects comprises a set of tags and a set of text strings; and the set of genericized versions of the collection of dynamic content document objects comprise the set of tags and a set of spaces in place of the set of text strings.

12. The computer-implemented method of claim 1, further comprising:

transmitting a script, using the network, to process the collection of dynamic content document objects.

13. The computer-implemented method of claim 12, wherein:

transmitting the collection of dynamic content document objects using the network comprises sending a set of regular expressions using the network with reference to a hypertext markup language encoding of the webpage; and the script comprises instructions on how to use the set of regular expressions to replace the set of genericized versions of the collection of dynamic content document objects with the collection of dynamic content document objects.

14. One or more non-transitory computer-readable media storing computer executable instructions that, when executed by an edge computing system, causes the edge computing system to execute a computer-implemented method comprising:

transmitting a first edge request for a webpage using a network;

transmitting a second edge request for the webpage using the network;

analyzing, using an analysis, a first response to the first edge request and a second response to the second edge request;

identifying, based on the analysis, a collection of dynamic content document objects on the webpage, wherein the webpage comprises the collection of dynamic content document objects and a collection of static content document objects;

generating a genericized static version of the webpage, wherein the genericized static version of the webpage includes the collection of static content document objects and a set of genericized versions of the collection of dynamic content document objects;

caching, using a cache, the collection of static content document objects;

receiving a client request for the webpage;

transmitting in response to receiving the client request for the webpage: (i) the collection of static content document objects from the cache using the network; and (ii) a third edge request for the collection of dynamic content document objects using the network;

receiving the collection of dynamic content document objects in response to the third edge request; and transmitting the collection of dynamic content document objects, as received in response to the third edge request using the network.

15. The one or more non-transitory computer-readable media of claim 14, wherein:

the first response comprises a first hypertext markup language encoding of the webpage with a first set of dynamic content for the collection of dynamic content document objects;

the second response comprises a second hypertext markup language encoding of the webpage with a second set of dynamic content for the collection of dynamic content document objects; and the analysis comprises a text comparison of the first hypertext markup language encoding of the webpage and the second hypertext markup language encoding of the webpage.

16. The one or more non-transitory computer-readable media of claim 14, wherein identifying the collection of dynamic content document objects comprises generating a set of regular expressions with reference to a hypertext markup language encoding of the webpage.

17. The one or more non-transitory computer-readable media of claim 14, wherein the computer-implemented method further comprises:

generating a genericized static version of the webpage, wherein the genericized static version of the webpage includes the collection of static content document objects and a set of genericized versions of the collection of dynamic content document objects.

18. The one or more non-transitory computer-readable media of claim 17, wherein:

identifying the collection of dynamic content document objects comprises generating a set of regular expressions with reference to a hypertext markup language encoding of the webpage; and the genericized static version of the webpage, the set of regular expressions, and the collection of dynamic content document objects contain, in combination, sufficient information to reconstitute the webpage.

19. The one or more non-transitory computer-readable media of claim 18, wherein the computer-implemented method further comprises:
transmitting the collection of static content document objects from the cache using the network comprises transmitting the genericized static version of the webpage using the network.

20. The one or more non-transitory computer-readable media of claim 17, wherein the computer-implemented method further comprises:
transmitting a script, using the network, to process the collection of dynamic content document objects.

21. The one or more non-transitory computer-readable media of claim 20, wherein:
transmitting the collection of dynamic content document objects using the network comprises sending a set of regular expressions using the network with reference to a hypertext markup language encoding of the webpage; and
the script comprises instructions on how to use the set of regular expressions to replace the set of genericized versions of the collection of dynamic content document objects with the collection of dynamic content document objects.

22. An edge computing system comprising:
a means for transmitting a first edge request for a webpage using a network;
a means for transmitting a second edge request for the webpage using the network;
a means for analyzing, using an analysis, a first response to the first edge request and a second response to the second edge request;
a means for identifying, based on the analysis, a collection of dynamic content document objects on the webpage, wherein the webpage comprises the collection of dynamic content document objects and a collection of static content document objects;
a means for caching the collection of static content document objects, wherein the means for caching includes a cache;
a means for receiving a client request for the webpage;
a means for transmitting the collection of static content document objects from the cache using the network in response to receiving the client request for the webpage;
a means for transmitting a third edge request for the collection of dynamic content document objects using the network in response to receiving the client request for the webpage;
a means for receiving the collection of dynamic content document objects in response to the third edge request; and
a means for transmitting the collection of dynamic content document objects, as received in response to the third edge request, using the network
wherein the means for identifying does not require any labels that identify objects in a document object model of the webpage as dynamic or static content document objects.

23. A computer-implemented method executed by an edge computing system, the computer-implemented method comprising:
transmitting a first edge request for a webpage using a network;
transmitting a second edge request for the webpage using the network;
storing a first interactivity flow and a second interactivity flow with the webpage, wherein the first edge request is part of the first interactivity flow and the second edge request is part of the second interactivity flow;
analyzing, using an analysis, a first response to the first edge request and a second response to the second edge request;
identifying, based on the analysis, a collection of dynamic content document objects on the webpage, wherein the webpage comprises the collection of dynamic content document objects and a collection of static content document objects;
caching, using a cache, the collection of static content document objects;
receiving, a client request for the webpage;
transmitting in response to receiving the client request for the webpage: (i) the collection of static content document objects from the cache using the network; and (ii) a third edge request for the collection of dynamic content document objects using the network;
receiving the collection of dynamic content document objects in response to the third edge request; and
transmitting the collection of dynamic content document objects, as received in response to the third edge request using the network.

24. A computer-implemented method executed by an edge computing system, the computer-implemented method comprising:
transmitting a first edge request for a webpage using a network;
transmitting a second edge request for the webpage using the network, wherein the first edge request and the second edge request are sent as part of a caching schedule for the webpage and while a node of the edge computing system is idle;
analyzing, using an analysis, a first response to the first edge request and a second response to the second edge request;
identifying, based on the analysis, a collection of dynamic content document objects on the webpage, wherein the webpage comprises the collection of dynamic content document objects and a collection of static content document objects;
caching, using a cache, the collection of static content document objects;
receiving, a client request for the webpage;
transmitting in response to receiving the client request for the webpage: (i) the collection of static content document objects from the cache using the network; and (ii) a third edge request for the collection of dynamic content document objects using the network;
receiving the collection of dynamic content document objects in response to the third edge request; and
transmitting the collection of dynamic content document objects, as received in response to the third edge request using the network.

25. A computer-implemented method executed by an edge computing system, the computer-implemented method comprising:
transmitting a first edge request for a webpage using a network;
transmitting a second edge request for the webpage using the network;

analyzing, using an analysis, a first response to the first edge request and a second response to the second edge request;

identifying, based on the analysis, a collection of dynamic content document objects on the webpage, wherein the webpage comprises the collection of dynamic content document objects and a collection of static content document objects;

caching, using a cache, the collection of static content document objects;

receiving, a client request for the webpage;

transmitting in response to receiving the client request for the webpage: (i) the collection of static content document objects from the cache using the network; and (ii) a third edge request for the collection of dynamic content document objects using the network;

receiving the collection of dynamic content document objects in response to the third edge request; and transmitting the collection of dynamic content document objects, as received in response to the third edge request using the network;

wherein the computer-implemented method does not require any labels that identify objects in a document object model of the webpage as dynamic or static content document objects.

26. One or more non-transitory computer-readable media storing computer executable instructions that, when executed by an edge computing system, causes the edge computing system to execute a computer-implemented method comprising:

transmitting a first edge request for a webpage using a network;

transmitting a second edge request for the webpage using the network;

analyzing, using an analysis, a first response to the first edge request and a second response to the second edge request;

identifying, based on the analysis, a collection of dynamic content document objects on the webpage, wherein the webpage comprises the collection of dynamic content document objects and a collection of static content document objects;

generating, as part of identifying the collection of dynamic content document objects, a set of regular expressions with reference to a hypertext markup language encoding of the webpage;

caching, using a cache, the collection of static content document objects;

receiving a client request for the webpage;

transmitting in response to receiving the client request for the webpage: (i) the collection of static content document objects from the cache using the network; and (ii) a third edge request for the collection of dynamic content document objects using the network;

receiving the collection of dynamic content document objects in response to the third edge request; and transmitting the collection of dynamic content document objects, as received in response to the third edge request using the network.

\* \* \* \* \*